(12) United States Patent
Salkintzis (10) Patent No.: US 10,687,264 B2
(45) Date of Patent: Jun. 16, 2020

(54) APPARATUS AND METHOD FOR INTERNET PROTOCOL (IP) FLOW MOBILITY

(71) Applicant: GOOGLE LLC, Mountain View, CA (US)

(72) Inventor: Apostolis Salkintzis, Athens (GR)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/517,298

(22) PCT Filed: Oct. 6, 2015

(86) PCT No.: PCT/US2015/054205
§ 371 (c)(1),
(2) Date: Apr. 6, 2017

(87) PCT Pub. No.: WO2016/057490
PCT Pub. Date: Apr. 14, 2016

(65) Prior Publication Data
US 2017/0311219 A1    Oct. 26, 2017

(30) Foreign Application Priority Data
Oct. 6, 2014  (EP) .................................. 143860024

(51) Int. Cl.
*H04W 36/22* (2009.01)
*H04W 36/00* (2009.01)
(Continued)

(52) U.S. Cl.
CPC ....... *H04W 36/22* (2013.01); *H04W 36/0022* (2013.01); *H04W 84/12* (2013.01); *H04W 88/06* (2013.01); *H04W 88/10* (2013.01)

(58) Field of Classification Search
CPC ........... H04W 76/026; H04W 36/0022; H04W 36/0027; H04W 36/22; H04W 88/06
See application file for complete search history.

(56) References Cited

U.S. PATENT DOCUMENTS

2005/0181794 A1* 8/2005 Rajkotia ............... H04W 36/24
455/436
2009/0010153 A1* 1/2009 Filsfils .................... H04L 45/02
370/218
(Continued)

FOREIGN PATENT DOCUMENTS

CN       102450053 A     5/2012
WO    2013/068787 A1    5/2013
WO    2014043494 A1    3/2014

OTHER PUBLICATIONS

European Patent Office; International Search Report and Written Opinion; International Application No. PCT/US2015/054205; dated Jan. 5, 2016.
(Continued)

*Primary Examiner* — Hoon J Chung
(74) *Attorney, Agent, or Firm* — Marshall, Gerstein & Borun LLP (57) ABSTRACT

In one example, a method and apparatus for providing Internet protocol (IP) packet flow mobility from a first wireless access technology (RAT) interface to a second wireless access technology (RAT) interface communicates packet information of a first IP packet flow via the first RAT interface and transmits a redirection packet for the first IP packet flow via the second RAT interface during the communication of the packet information. The method and apparatus also transmits redirected packet information of the first IP packet flow to the second RAT interface in response to the receiving of redirected packet information of the first IP packet flow from the second RAT interface. In one example, a method and apparatus may receive redirected packet information of the first IP packet flow from the second RAT interface in response to the transmitting of the redirection packet. This operation may be carried out, for
(Continued)

example, in a UE. However, a network gateway may also initiate the redirection operation if desired.

31 Claims, 8 Drawing Sheets

(51) Int. Cl.
    *H04W 88/06*     (2009.01)
    *H04W 88/10*     (2009.01)
    *H04W 84/12*     (2009.01)

(56) References Cited

U.S. PATENT DOCUMENTS

| | | | |
|---|---|---|---|
| 2010/0137023 A1* | 6/2010 | Chishima | H04W 52/0261 455/552.1 |
| 2010/0291933 A1 | 11/2010 | Choi et al. | |
| 2012/0057457 A1* | 3/2012 | Ahmadi | H04L 12/5692 370/235 |
| 2012/0093145 A1* | 4/2012 | Anchan | H04W 28/24 370/352 |
| 2012/0218897 A1* | 8/2012 | Aramoto | H04W 36/0027 370/235 |
| 2013/0273916 A1 | 10/2013 | Gupta et al. | |
| 2013/0294314 A1 | 11/2013 | Lee et al. | |
| 2014/0073323 A1 | 3/2014 | Lee et al. | |
| 2014/0206353 A1 | 7/2014 | Kim et al. | |
| 2015/0294314 A1 | 10/2015 | Pattanayak et al. | |
| 2016/0242090 A1* | 8/2016 | Chen | H04W 36/28 |

OTHER PUBLICATIONS

European Patent Office; Extended European Search Report; EP Application No. 17186151.1; dated Oct. 5, 2017.
Korean Intellectual Property Office; Notice of Preliminary Rejection; KR Application No. 10-2016-7036943; dated Dec. 15, 2017.
Examination Report for India Application No. 201647044244, dated Aug. 23, 2019.
Notification of First Office Action for Chinese Application No. 201580034779.1, dated Oct. 11, 2019.

\* cited by examiner

FIG. 8

APPARATUS AND METHOD FOR INTERNET PROTOCOL (IP) FLOW MOBILITY

TECHNICAL FIELD

The present disclosure is related generally to wireless communications and, more specifically, to handover methods for offloading traffic from a first radio access technology (RAT) interface to a second RAT interface such as cellular network interface to a wireless local area network ("WLAN") interface.

BACKGROUND OF THE DISCLOSURE

The performance of Internet-based applications on mobile computing devices is affected by the capabilities of the underlying network technologies. To provide access to the Internet for applications on mobile devices, cellular wireless communication systems are widely deployed also referred to as radio access technology network. Such systems may be multiple-access systems able to support communication with multiple users by sharing system resources such as bandwidth and transmission power. Commonly used multiple-access systems include, but are not limited to, Code-Division Multiple Access systems, Time-Division Multiple Access systems, Frequency-Division Multiple Access, 3rd Generation Partnership Project Long Term Evolution systems, Long Term Evolution Advanced systems, Orthogonal Frequency-Division Multiple Access systems, and the like.

Additionally or alternatively, a wireless mobile computing device, such as user equipment (UE), may connect to data communications networks via a different radio access technology network such as a WLAN. Example WLAN networks include, but are not limited to, Wi-Fi networks, home WLANs, WLAN hotspots, public WLANs, private WLANs, and the like.

With an increasing number of mobile computing devices featuring WLAN-connectivity capability and with access to WLAN networks becoming more widely available, offloading data capabilities from a cellular network to a WLAN has emerged as an attractive feature for both cellular network operators and users.

3GPP specs currently support Internet Protocol (IP) packet flow mobility (see for example TS 23.261 incorporated herein by reference) but they require complicated protocols in the user equipment (UE) and gateway (PGW) (DSMIPv6) and they enable only UE-initiated IP flow mobility. However, many operators have expressed a strong need for network-initiated IP flow mobility.

The "IP flow mobility" is essentially a handover operation that applies to a specific IP flow only (e.g. to all packets with protocol=TCP and port=80). This is illustrated in the following FIGS. 1 and 2 which show that the result of an IP flow mobility procedure is IP flow #2 being transferred from a first radio access technology (RAT) network, such as 3GPP access interface to a second and different radio access technology network interface such as a WLAN access interface.

Figure 1:
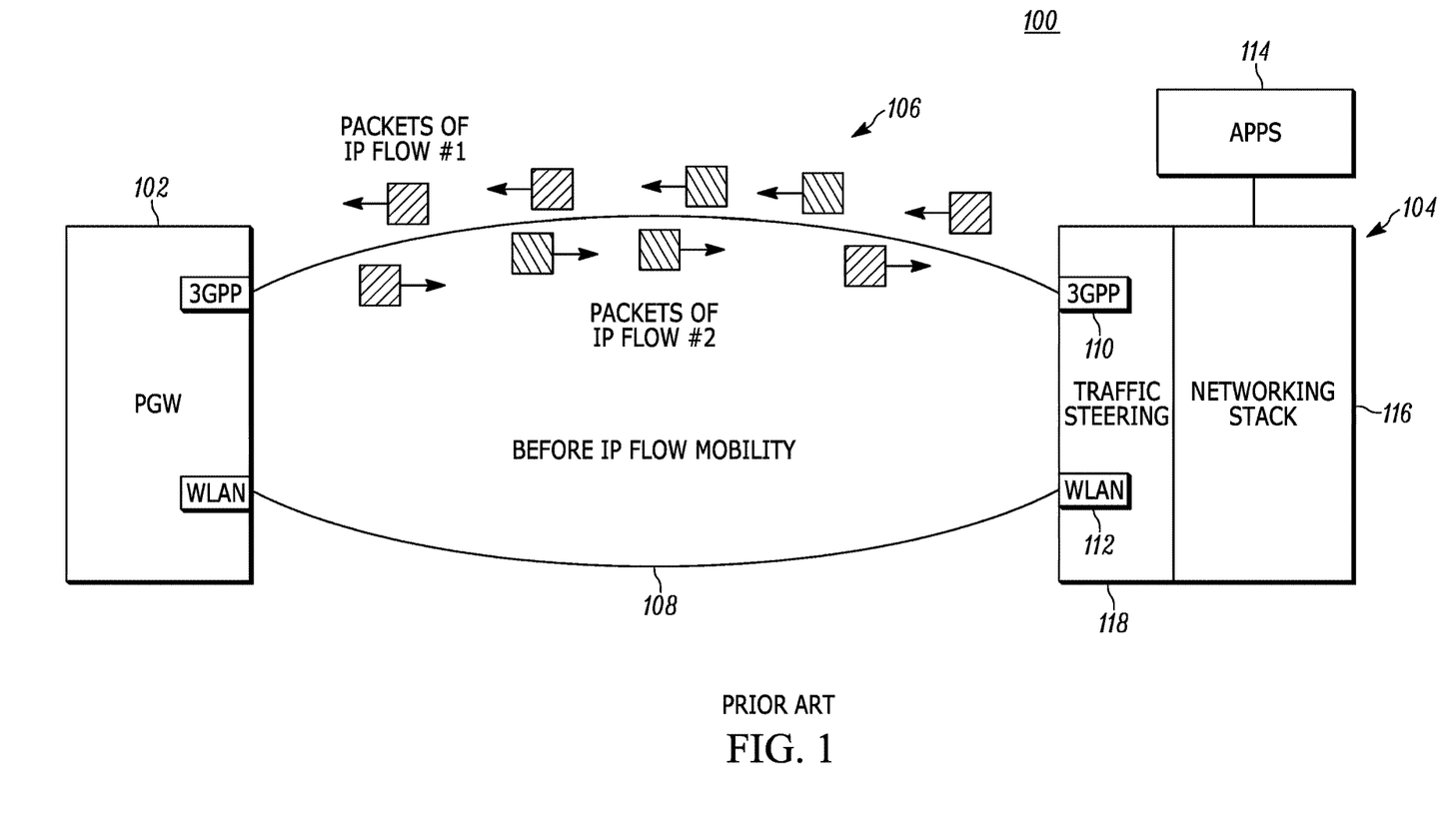
FIG. 1 is a block diagram illustrating one example of a prior art system.
Figure 2:
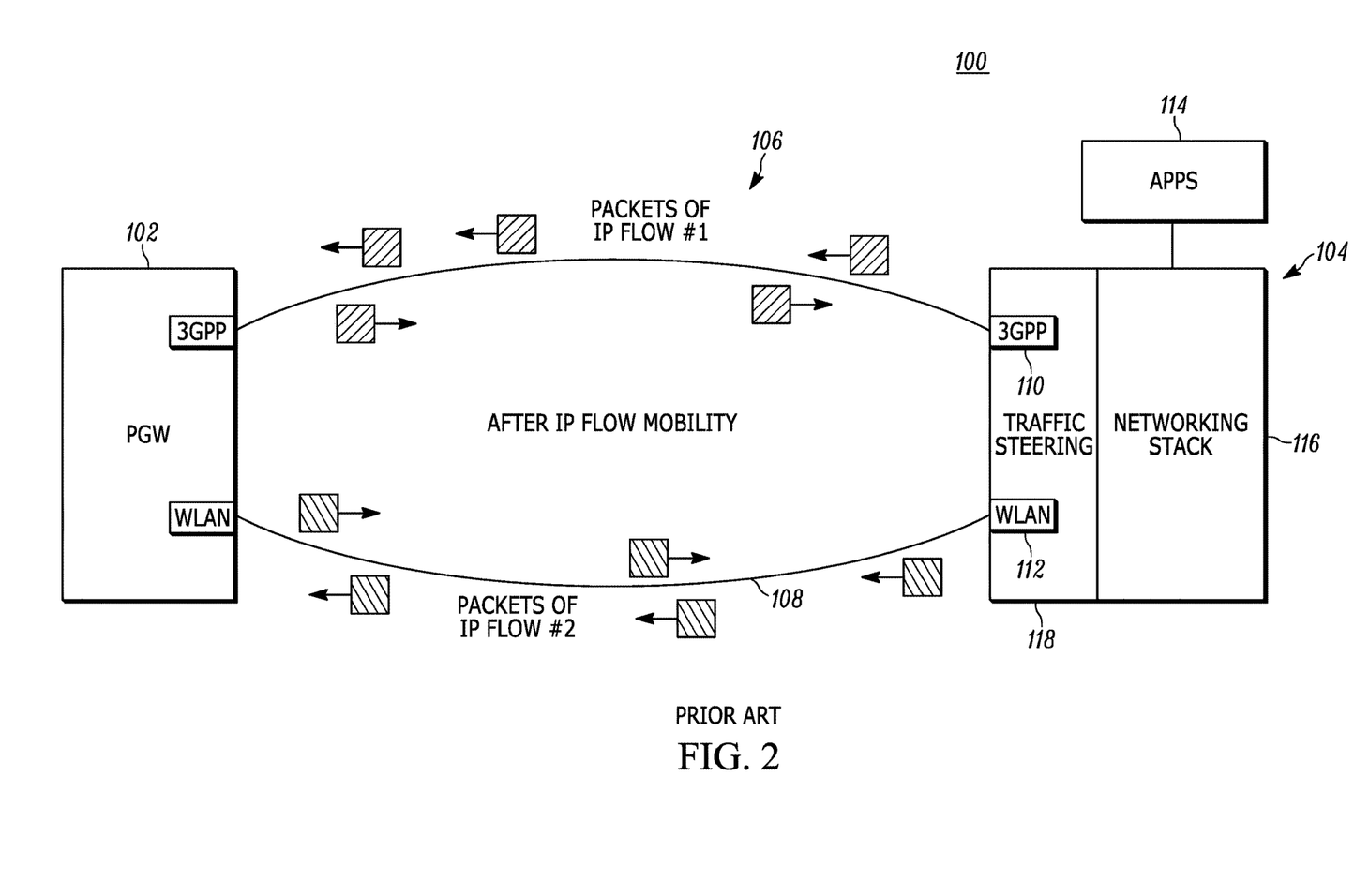
FIG. 2 is a block diagram illustrating internet protocol packet flow mobility in accordance with a prior art operation.

FIG. 1 illustrates one example of a system 100 that includes a packet gateway 102 in communication with user equipment 104 that are in communication using a wireless radio access technology network 106, such as a cellular network, and a different wireless radio access technology network 108 such as a wireless local area network. One of the most popular uses for wireless devices is accessing packet-data networks (PDNs), the most famous example of which is the Internet. In third generation partnership project (3GPP) networks, the user equipment (UE) can have one or more PDN connections. The UE can establish a PDN connection using different types of radio access technologies. In this example, the radio access technology network 106 is shown to be a 3GPP radio access technology network such that the UE 104 includes a 3GPP transceiver 110 and the PGW 102 utilizes a corresponding interface. The UE 104 also includes a WLAN transceiver 112 to communicate via the network 108 with the PGW 102. The PGW 102 likewise has a corresponding WLAN interface. The WLAN may be an Institute for Electrical and Electronics Engineers (IEEE) 802.11 Family of Standards Compliant Network. The PGW may be part of a network as known in the art.

FIG. 1 also illustrates uplink packets of IP flow #2 transmitted by the UE 104 and being received by the PGW 102 via 3GPP access network 106 and downlink IP flow packets #2 transmitted by the PGW 102 and being received by the UE 104 via 3GPP access network 106. This is before IP flow mobility occurs. The UE includes one or more processors and associated memory wherein the memory stores executable instructions that when executed by the processor, cause the processor to operate in a particular manner. In this example, the UE is shown to include applications 114 that may be stored in memory, for example, as well as a networking stack module 116 which may be the processor executing networking stack instructions. In addition, the UE may include a traffic steering module 118 that may also be a processor executing traffic steering instructions. As shown, before IP flow mobility is activated, all the packets of multiple packet flows occur over the 3GPP access network 106.

Most solutions in prior art enable an IP flow to be transferred from one RAT access to a different RAT access by exchanging routing rules between the UE and the gateway (PGW). For example, referring to FIG. 2, when the UE wants to transfer IP flow #2 from 3GPP access network 106 to WLAN access network 108, it sends a new routing rule to the PGW that indicates to route all downlink packets of IP flow #2 to WLAN 108. The PGW responds to the UE by indicating if the new routing rule was applied or was rejected. However, exchanging routing rules between the UE and the PGW is very complicated: It requires new signaling between the UE and MME, between MME and SGW, between SGW and PGW, etc. Apparently, exchanging routing rules between the UE and PGW has a big system-wide impact and may result in expensive deployments.

BRIEF DESCRIPTION OF THE DRAWINGS

The disclosure will be more readily understood in view of the following description when accompanied by the below figures and wherein like reference numerals represent like elements, wherein.

DETAILED DESCRIPTION OF EMBODIMENTS

Briefly, as opposed to prior art, which either requires complicated protocols (DSMIPv6) or the exchange of routing rules, a new solution for IP flow mobility is disclosed, which has minor impact to the UE and the PGW only (does not need to affect other network elements) and can be easily implemented.

In one example, a method and apparatus for providing Internet protocol (IP) packet flow mobility from a first wireless access technology (RAT) interface to a second wireless access technology (RAT) interface communicates packet information of a first IP packet flow via the first RAT interface. The method and apparatus transmits a redirection packet for the first IP packet flow via the second RAT interface during the communication of the packet information via the first RAT interface. The method and apparatus receives redirected packet information of the first IP packet flow from the second RAT interface in response to the transmitting of the redirection packet. The method and apparatus also transmits redirected packet information of the first IP packet flow to the second RAT interface in response to the receiving of redirected packet information of the first IP packet flow from the second RAT interface. These operations may be carried out, for example, in a UE. However, a network gateway or other network element may also initiate the redirection operation if desired.

Taken from the perspective of, for example, a network gateway, a method may include receiving the redirection packet for the first IP packet flow via a second access interface and transmitting the redirected packet information of the first IP packet flow to a second access interface corresponding to the second RAT interface, in response to receiving the redirection packet. In another example, a UE may perform the receipt of the redirection packet from, for example, a network gateway or other suitable network element. After receiving the redirection packet for the first IP packet flow via a second access interface or the second RAT interface, the UE or the PGW may decide to either accept or reject the redirection of the first IP packet flow. The UE or PGW may transmit the redirected packet information of the first IP packet flow to a second RAT interface or second access interface, if desired, only when they decide to accept the redirection of the first IP packet flow to the second RAT interface or second access interface.

From the perspective of the PGW, the PGW may include a first access interface that corresponds to the first RAT network (e.g., uses to communicate packet with a first RAT interface in a UE) and a second access interface that corresponds to the second RAT network (e.g., used to communicate packets with the second RAT interface of the UE). The PGW may include a processor, operatively coupled to the first access interface and the second access interface, the processor operative to communicate packet information of a first IP packet flow via the first access interface (that corresponds to the first RAT interface of the UE) and transmit a redirection packet for the first IP packet flow to the second access interface during the communicating. The processor may be operative to receive redirected packet information of the first IP packet flow from the second RAT interface in response to the transmitting of the redirection packet and transmit redirected packet information of the first IP packet flow to the second access interface in response to the receiving of redirected packet information of the first IP packet flow from the second RAT interface.

In one example, the redirection packet includes header information that is the same header information as headers of the packet information of the first IP flow that is communicated via the first RAT interface. This may include, for example, having the same source and destination address in the IP header as well as a protocol definition as the IP packet information in the IP packet flow being redirected (e.g., same IP header, TCP header, UDP header). By way of example, the redirection packet may have a first port specified in the IP header information that is the same port specified in the IP header information of the IP packet flow. The redirection packet may include, for example, data representing that the packet should be discarded at an IP layer. If multiple IP flows are being communicated between a UE and a PGW, for example, one flow may not be affected whereas another flow may be redirected to a different RAT interface. As such, packet information may be communicated from an IP packet flow via a first RAT interface prior to transmitting redirected packet information of a first IP packet flow from a second RAT interface. Packet information may be transmitted from the second IP packet flow via the first RAT interface after transmitting the redirected packet information of the first IP packet flow from the second RAT interface.

If desired, the UE may take priority control over the redirection operation initiated by a PGW. In one example, the PGW or other network element may mark the first IP packet flow or other packet flow, as non-transferable to a different RAT in response to the redirection packet being rejected by the UE. The PGW may then refrain from sending a further redirection packet for the first IP packet flow or other IP packet flow. In another example, where multiple flows are being communicated, the PGW may transmit a second redirection packet for the second IP packet flow to the second RAT interface of the UE and may receive a rejection of the second redirection packet from the UE. The PGW may mark a second IP packet flow as non-transferable to the second RAT interface in response to rejection, and refrain from sending a further redirection packet for the second IP packet flow.

In another example, a method and apparatus communicates via a cellular interface, by a user equipment, packets having a first port specified in IP header information. The method and apparatus transmits, via a WLAN interface, by the UE, a redirection packet having a first port specified in IP header information. The method and apparatus receives via the WLAN interface, by the UE, packet information having a first port specified in IP header information in response to transmitting the redirection packet.

In another example, a redirection packet may be rejected if received by a UE if the request for redirection imposed by the redirection packet is against provisioned routing policy in the UE such as an access-network discovery and selection function (ANDSF) policy. Similarly, a redirection packet may be rejected if received by a PGW if the request for redirection imposed by the redirection packet is against local routing policy in the PGW or against policy received from a Policy and Charging Control (PCC) function. In another example, when a UE receives a redirection packet from, for example, a PGW, the UE may reject the request for redirection imposed by the redirection packet if a signal level received at the second RAT interface is below a desired threshold. In another example, a UE, for example, may receive a redirection packet and determine that a local policy of the UE prohibits the UE from simultaneously using the first RAT interface and the second RAT interface and may reject the redirection packet from a PGW or other source. In another example, a UE may prohibit simultaneous use of the first and second RAT interface based on a battery level of the UE so that battery savings may occur by denying redirection to one of the RAT interfaces.

In another example, a method and apparatus may continue to communicate packet information of the first IP packet flow via the first RAT interface even after receiving the redirection packet until a signal level received at the second RAT interface is above a desired threshold. In response, the method and apparatus may transmit redirected packet information of the first IP packet flow via the second RAT interface. In another example, the method and apparatus may include continuing to communicate packet information via the first RAT interface even after receiving the redirection packet in response to a signal level of a second RAT interface being below a desired threshold. If desired, an apparatus and method may also mark the first IP packet flow as requiring a transfer to a different RAT and continuing to communicate for a predetermined time period, such as by a UE, via the first RAT interface and then transmit the redirected packet information after the predetermined time period has expired to allow temporary conditions to expire that prevent a redirection from occurring, such as a low signal level of a second RAT interface, for example.

FIGS. 3-7 illustrate a UE-initiated IP flow mobility procedure to change IP packet flow for the packet information from the first RAT network 106 to the second RAT network 108. For example, the UE may have the routing rule "route IP flow X to WLAN, if the measured WLAN signal strength is larger than Y dBm". In this case, when the WLAN signal strength exceeds the threshold Y dBm, the rule become valid and triggers redirection of IP flow X. A similar rule may be considered for 3GPP access (route an IP flow to LTE, if the measured LTE signal strength is larger to Z dBm). Another example: "route IP flow Y to WLAN, if the estimated WLAN throughput exceeds 2 Mbps". Network initiated IP flow mobility, such as by the PGW, is also disclosed below.

Figure 3:
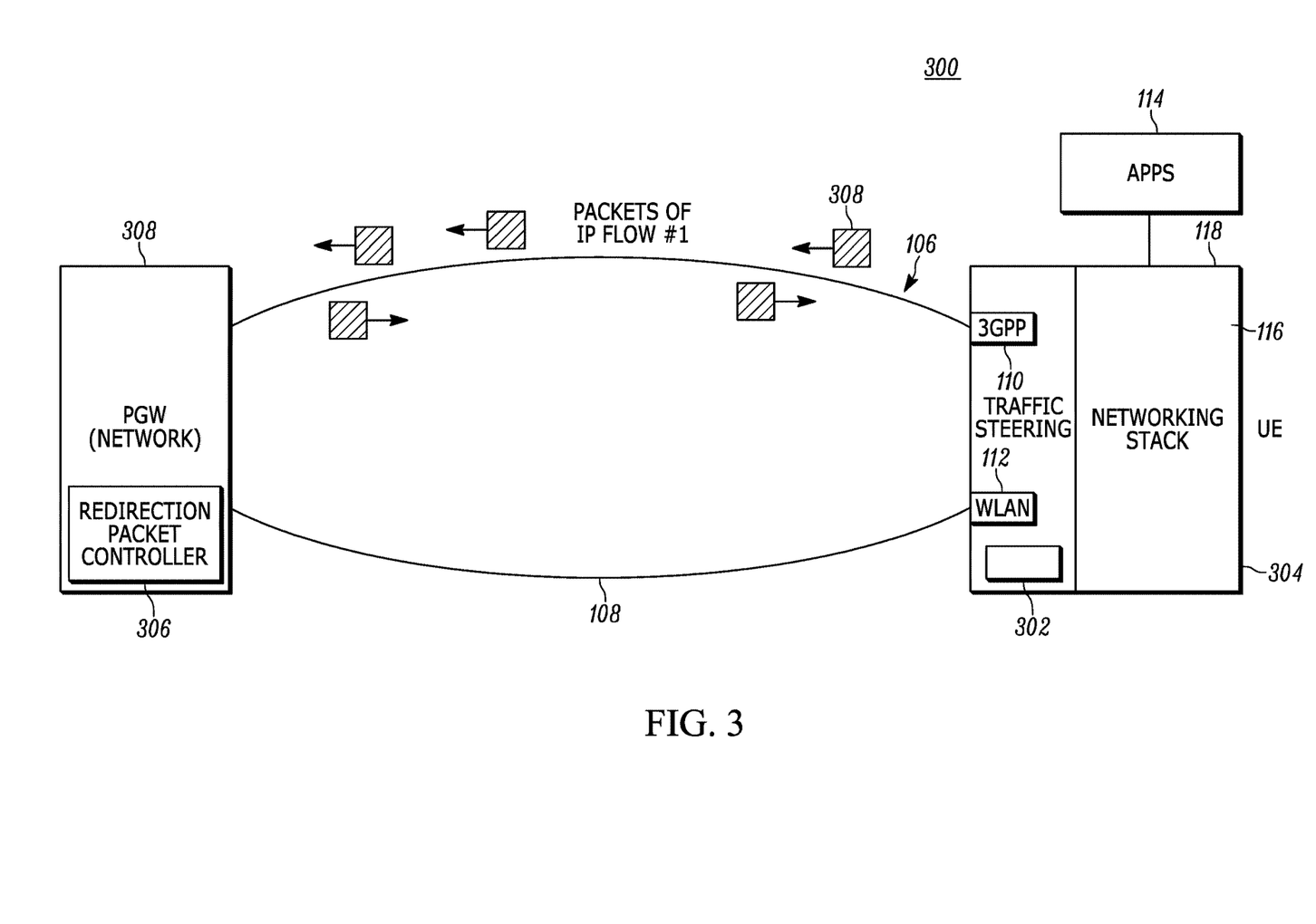
FIG. 3 is a block diagram of a system employing a redirection packet control mechanism in accordance with one example set forth in the disclosure.
Figure 4:
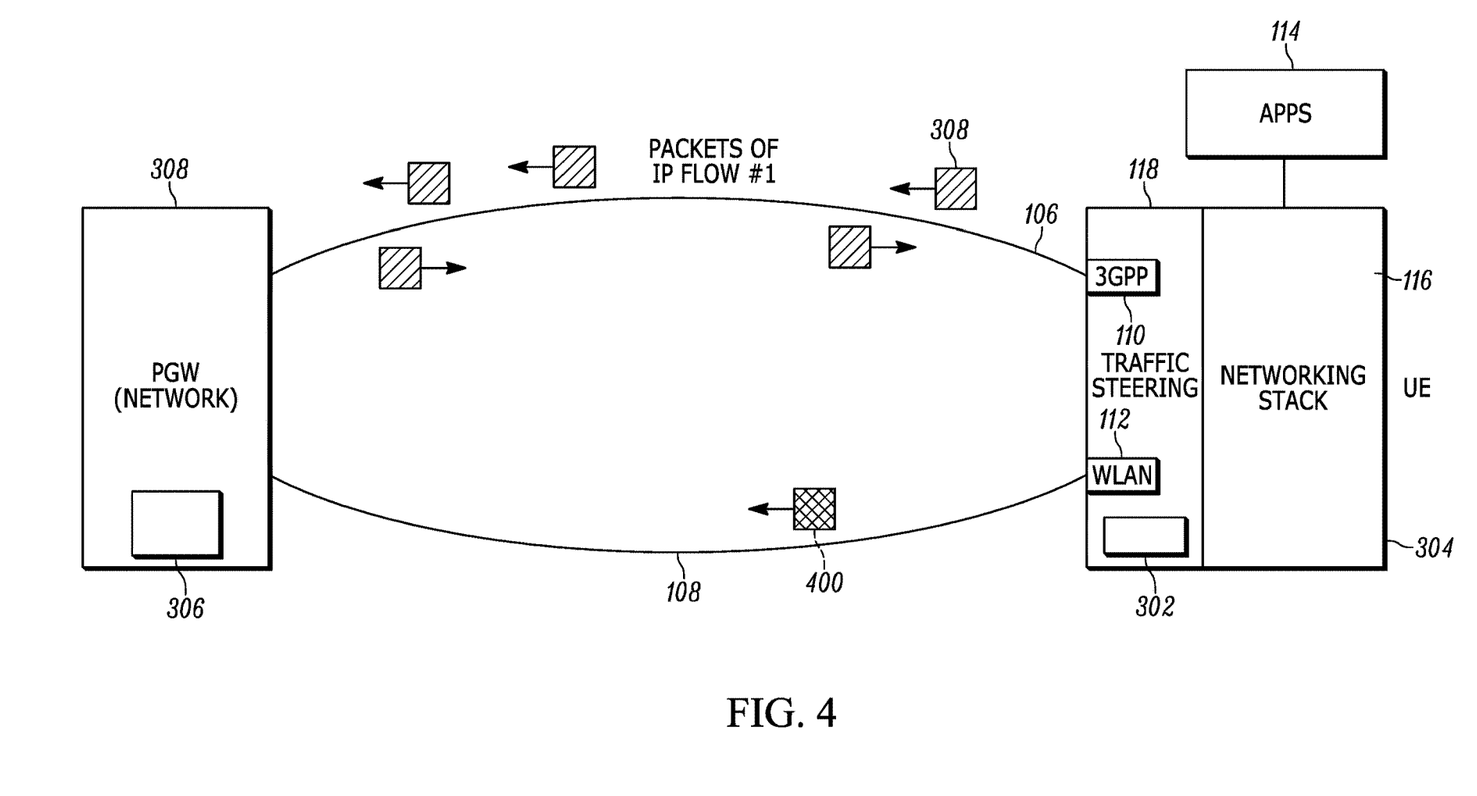
FIG. 4 is a block diagram of a system employing a redirection packet control mechanism in accordance with one example set forth in the disclosure.
Figure 5:
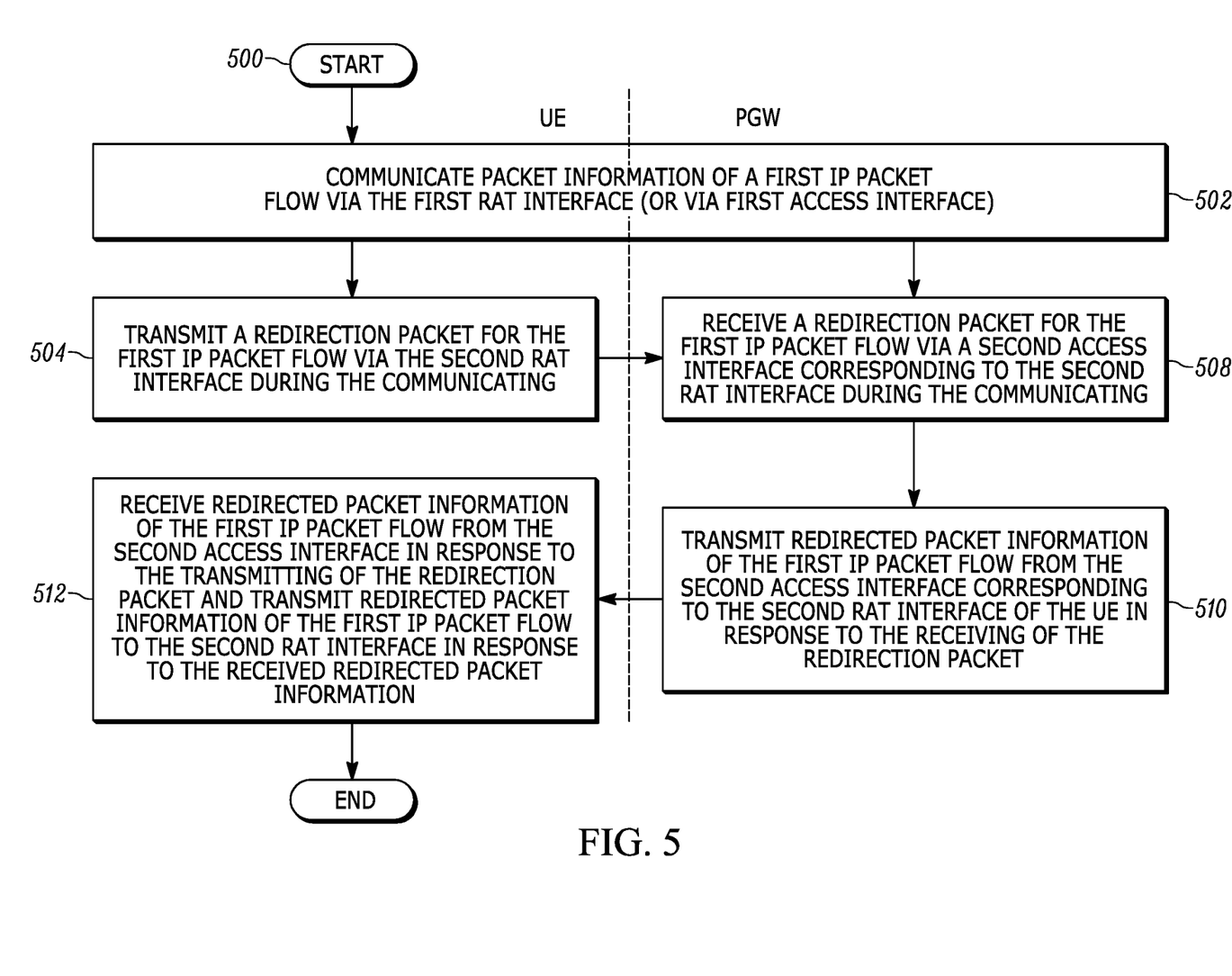
FIG. 5 is a method for providing internet protocol packet flow mobility in accordance with one example set forth in the disclosure.

FIG. 3 illustrates one example of a wireless system 300 wherein the UE 304 (also referred to as a wireless mobile computing device) includes a redirection packet generator 302. The UE 304 in this example communicates, by the cellular interface, packets of IP flow 308 having a first port specified in IP header information. When the UE 304 determines that the packets of IP flow 308 should be redirected to WLAN interface 112, the redirection packet generator 302 generates a redirection packet 400 (see FIG. 4) having the same first port specified in an IP header information as the packets of the IP flow 308. The UE 304 receives via the WLAN interface 112, packet information having the same first port specified in the IP header information that has been redirected by the PGW in response to the redirection packet 400.

The redirection packet generator 302 may be implemented as a processor executing executable instructions that are stored in memory that operates as a redirection packet generator as described herein. However, it will be recognized that any suitable structure may be employed including discrete logic, such as state machines, or any other suitable structure. The redirection packet generator 302 being in the UE allows a UE-initiated IP flow mobility procedure. If the goal is to also provide, or instead provide, a network level redirection packet control as further described below, a redirection packet generator, similar to that shown in the UE may be employed in the PGW or any other suitable network element. This provides a network-initiated IP flow mobility operation as further set forth below.

The PGW 308 includes a redirection packet controller 306 that receives the redirection packet 400 from the UE 304 and redirects the IP flow 308 to the other RAT interface of the UE. The redirection packet controller 306 may also be implemented as a processor executing executable instructions that are stored in memory that operates as a redirection packet controller as further set forth below. However, it will be recognized that any suitable structure may also be employed including discrete logic, such as state machines, or any other suitable structure as desired. Before the redirection packet controller 306 redirects the IP flow 308 to the other RAT interface of the UE, the redirection packet controller 306 may need to determine if this redirection is allowed. For this purpose, the redirection packet controller 306 may check if this redirection is against local policy in the PGW or it may ask another network function, for example, the Policy and Charging Control (PCC) function, to determine if this redirection is allowed.

As further illustrated in FIG. 3, the UE 304 and PGW 308 exchange packets of IP flow #1 in this example, over 3GPP access network interface 106 and a corresponding access interface in the PGW initially. The IP flow could be composed of packets with, for example, a protocol equal to a TCP and a source or destination port equal to 80. In general, however, the packets of the IP flow could fulfill other criteria, for example, including the same information in specific parts of their IP headers, as well as including the same information in specific parts of additional networking headers (such as TCP headers, HTTP headers, ESP headers, etc.), Referring to FIGS. 4-6, the operation of the redirection packet generator 302 will be described. As shown, for example, in block 500 (FIG. 5), the initial communication may be a single IP flow for example, from a YouTube video or other information source. As shown in block 502, the method may include communicating for example, via the cellular interface 110, by the user equipment 304, packets (packet information) of a first IP packet flow having a first header information specified in their headers, such as in IP headers, TCP headers, etc. When there is a decision to move the IP flow #1 to the WLAN access network 108, the redirection packet generator 302 generates a redirection packet 400 and transmits the redirection packet 400 for IP flow #1 over the WLAN network 108 to indicate to the PGW 308 that it wants to redirect IP flow #1 to the WLAN access network 108 from the cellular network 106 as shown in block 504. The redirection packet 400 in this example is created by the redirection packet generator 302 as part of a traffic steering module and in this example, is not created by the application 114. The redirection packet 400 is part of the IP flow #1 so it includes the same first header information that is also included in the packets of IP flow #1. However, in contrast to the packets of IP flow #1, which carry in their header information a time-to-leave (TTL) value greater to 1, the redirection packet includes TTL equal to 1. The PGW 308 receives the redirection packet 400 via a second access interface of the PGW from the second RAT interface of the UE as shown in block 508. When the redirection packet 400 is received by the PGW 308 via the redirection packet controller 306, the PGW 308 discards the redirection packet at the IP layer. As noted above, the redirection packet 400 includes a same first header information as the packets in the IP flow #1 except that it contains data, such as the TTL=1 data that causes the redirection packet to be discarded. The redirection packet may have no data as part of its payload or it may contain additional data if desired, for example, to specify why the redirection is requested (e.g. because of radio signal conditions, or because enforcing local or ANDSF policy, etc.). The PGW 308 may separate fixed interfaces used to route the traffic that goes to UE over WLAN and over 3GPP using access interfaces. The PGW may have virtual interfaces, for example, GTP (GPRS Tunneling Protocol) interfaces. Such virtual interface are implemented on top of physical fixed interfaces (and they look similar to VPN tunnels). One virtual interface in the PGW is a WLAN access interface used to send traffic to the UE over the WLAN and another virtual interface in the PGW is a cellular interface used to send traffic to the UE over the 3GPP network. The PGW has a WLAN interface which may be a virtual or fixed interface corresponding to a WLAN RAT interface in UE and is used to send traffic to the UE over WLAN access and, similarly, a 3GPP (cellular) access interface corresponding to the 3GPP interface of the UE. The PGW 308 also includes a redirection packet controller 306 that redirects the packets of IP flow #1 to the other RAT network 108 in response to receiving the redirection packet by transmitting the redirected packet information of IP flow #1 as shown in block 510. As shown in block 512, the UE receives, via the WLAN interface, redirected packet information having the same header information as the header information included in the packets of IP flow #1.

Figure 6:
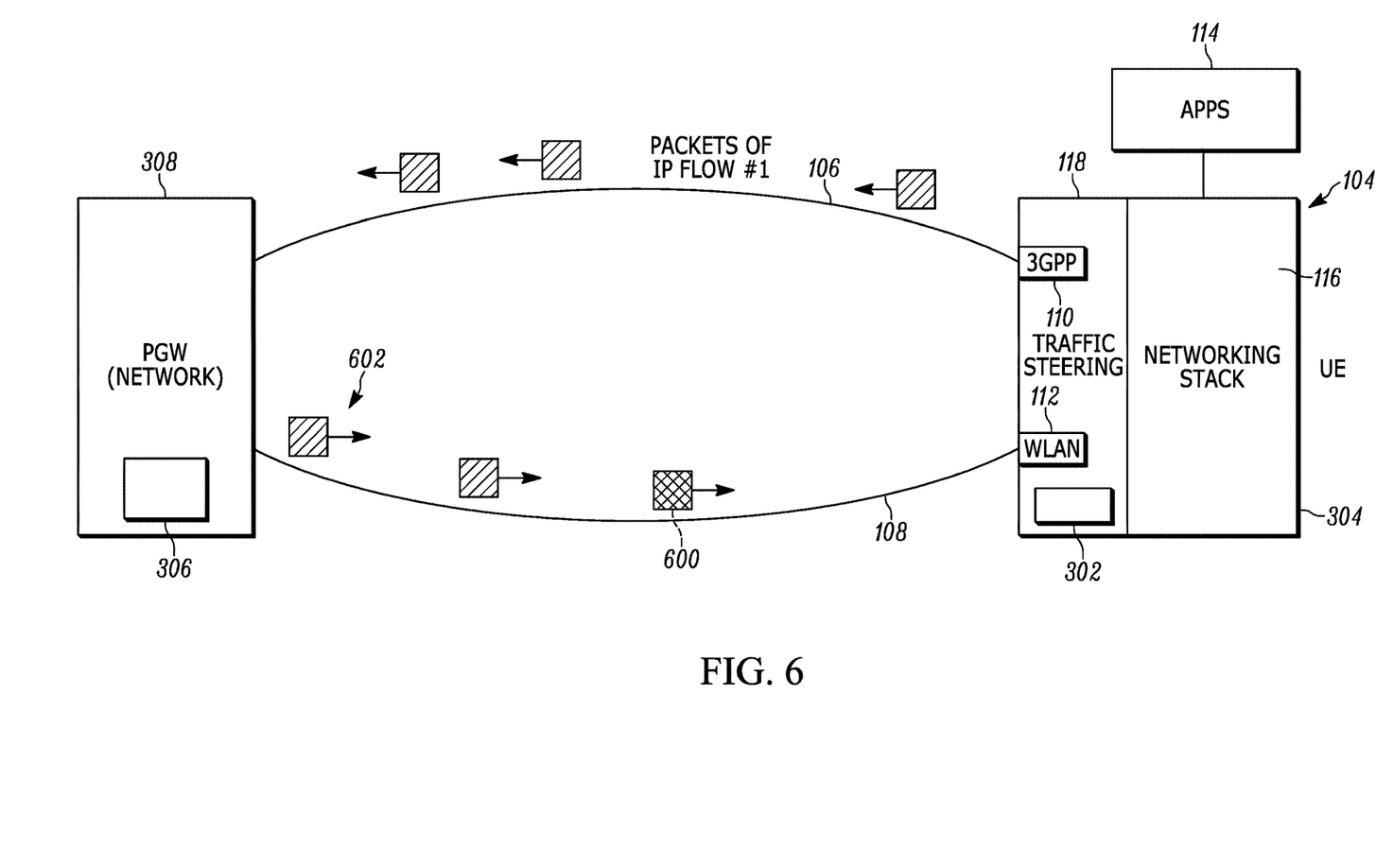
FIG. 6 is a block diagram of a system employing a redirection packet control mechanism in accordance with one example set forth in the disclosure.

In one example, the PGW 308 can accept or reject the UE's redirection packet (which is treated as a request) and when rejected, the PGW 308 may keep sending downlink packets for IP flow #1 over the 3GPP access network 106. The redirection packet controller 306 in the PGW 308 decides to accept or reject the redirection request imposed by the redirection packet 400, by checking, for example, if the requested redirection is against local policy in the PGW or by asking another network function, for example, the Policy and Charging Control (PCC) function, to determine if this redirection is allowed. However, as shown in FIG. 6, if the redirection packet controller 306 in the PGW 308 accepts the redirection packet, the PGW 308 responds to the redirection packet 400 with an ICMP Time-Exceeded as per normal IPv4/v6 procedures. Thereafter, the PGW 308 updates its flow binding table and sends subsequent downlink packets of IP flow #1 over the WLAN network 108 as a redirected IP packet flow of the packet information from the first RAT network 106 in response to the communication of the redirection packet 400. The response to the redirection packet with an ICMP Time-Exceeded is shown as data 600.

Figure 7:
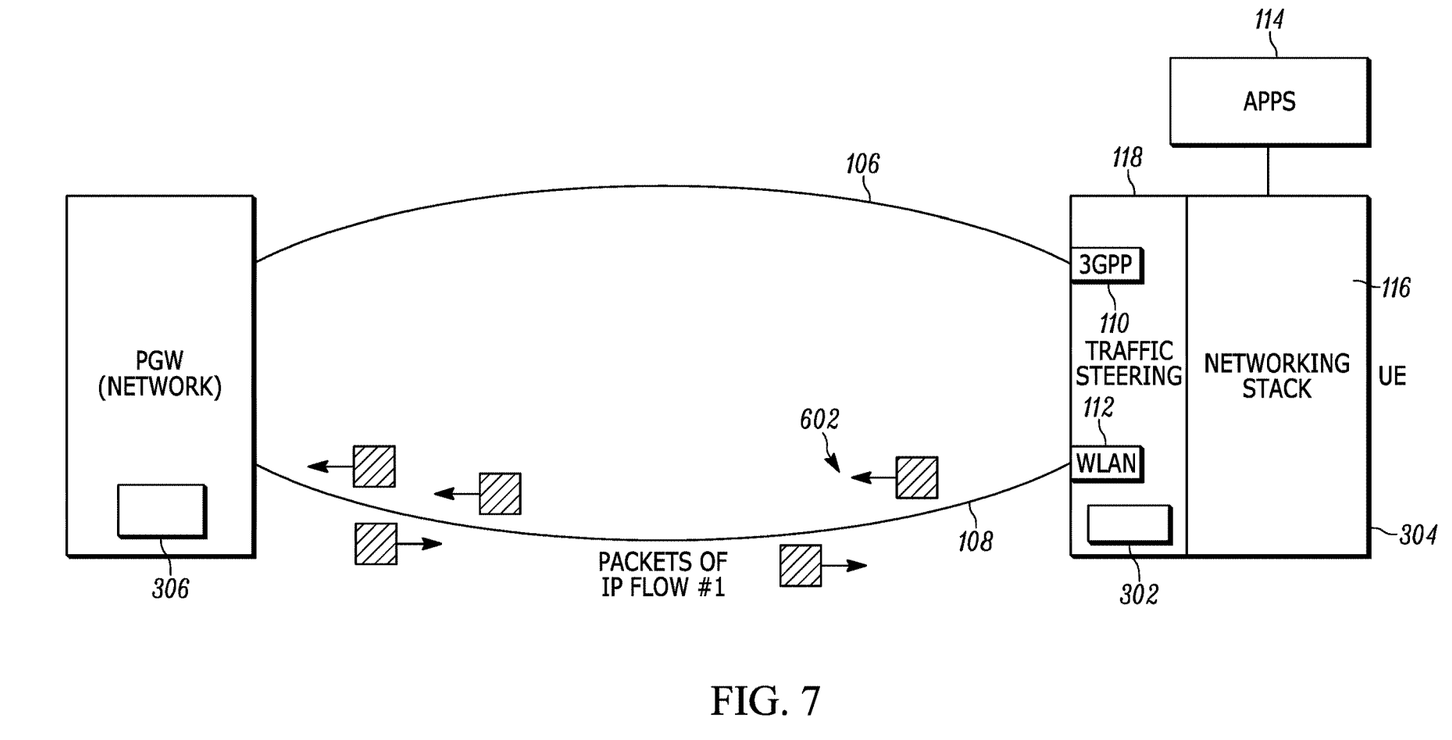
FIG. 7 is a block diagram of a system employing a redirection packet control mechanism in accordance with one example set forth in the disclosure.

As shown in FIG. 7, when the UE receives the redirected first downlink packet of IP flow #1 over the WLAN network 108, it updates its flow binding table and transmits subsequent uplink packets 602 for IP flow #1 back over the WLAN network 108 to the PGW 308 to effect redirection in both directions. Stated another way, when the UE (or PGW) starts receiving packets of IP flow #1 from the second RAT from the PGW, it also starts transmitting packets of IP flow #1 to the second RAT 108 via the second RAT interface. Hence the UE (or PGW when it sends the redirection packet 400) transmits redirected packet information of the first IP packet flow to the second RAT interface in response to the receiving of redirected packet information of the first IP packet flow from the second RAT interface.

Figure 8:
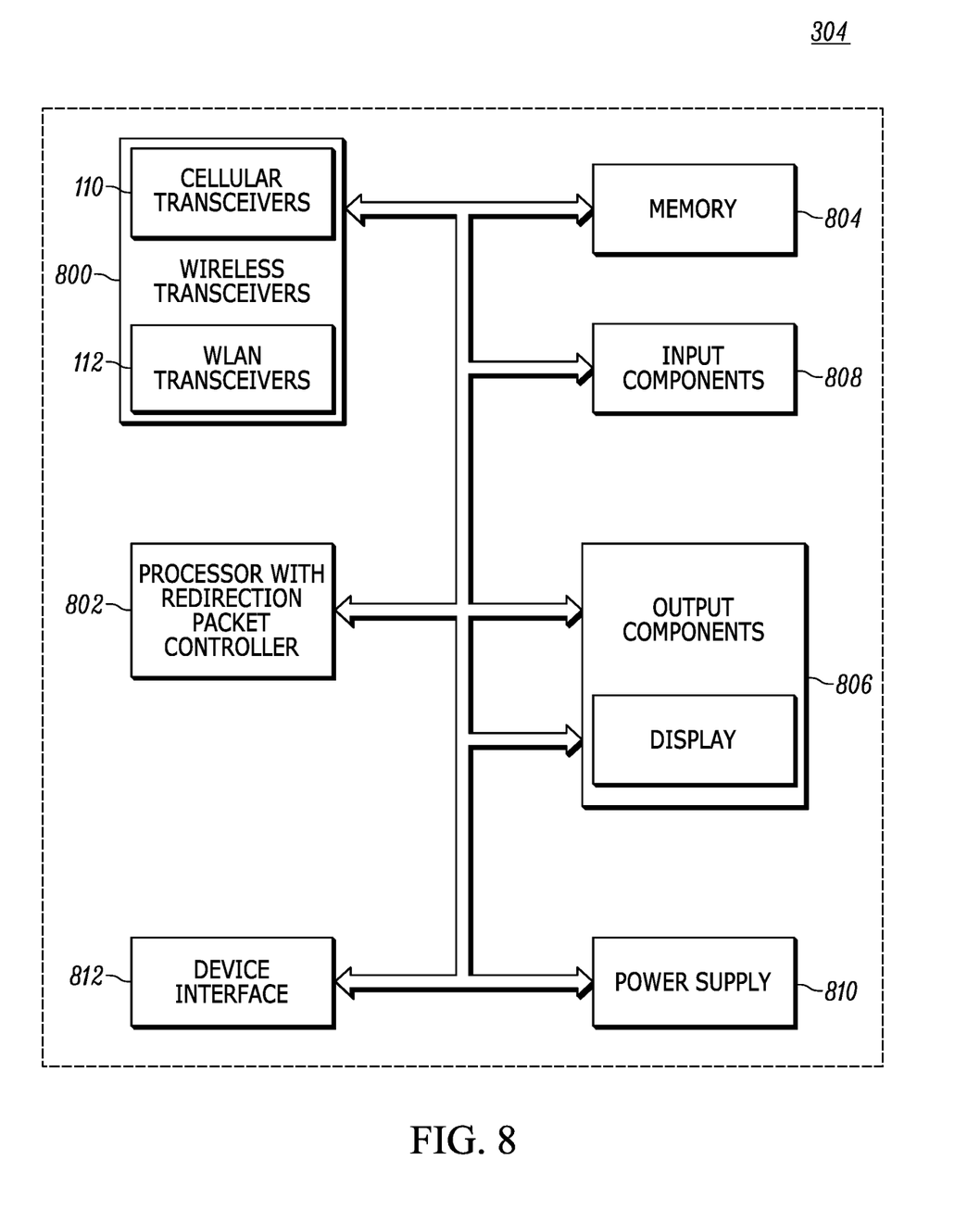
FIG. 8 is a block diagram of a wireless mobile computing device in accordance with one example set forth in the disclosure.

Referring to FIG. 8, one example of a UE 304 is shown and it is to be understood that FIG. 8 is provided for illustrative purposes only for illustrating components of a UE 304 in accordance with one aspect of the disclosure and is not intended to be a complete schematic diagram of the various components required for a UE. The UE 304 may include various other components not shown in the figure or may include a combination of two or more components or a division of a particular component in two or more separate components and still be within the scope of the present disclosure. The example components may include, but are not limited to, one or more wireless transceivers 800, a processor 802, one or more memories 804, one or more output components 806, one or more input components 808, a power supply 810, and device interfaces 812. The wireless transceiver 800 may include cellular transceiver 110 and WLAN transceiver 112. The processor operates as a redirection packet generator 302 in addition to the traffic steering module and networking stack modules. Corresponding executable instructions may be stored in memory 804 and executed by the processor 802.

The cellular transceiver 110 may utilize wireless technology for communication, such as, but not limited to, cellular based communication such as analog communications, digital communications, or next generation communications as represented by cellular transceiver. The cellular transceiver may be configured to establish the cellular connection to a PGW in the cellular network, or any other suitable network.

The WLAN transceivers 112 may also utilize wireless technology and may include peer to peer or ad hoc communications such as home RF, ANT, Bluetooth, IEEE 802.11 (a, b, g, or n) or other forms of wireless communications such as infrared technology. The WLAN transceivers may be employed to establish the WLAN network.

The device interface 812 may provide a direct connection, have auxiliary components or accessories for additional enhanced functionality as known in the art. The processor may be one or more CPUs, DSP or any other suitable processor that executes the executable instructions stored in memory 804. The memory 804 may also store data as well as executable instructions as known in the art and may be any suitable memory such as RAM, ROM or any other suitable memory technology as desired.

Network-Initiated IP Flow Mobility

The same procedure can be used to support Network-initiated IP flow mobility—in this case the PGW 308 includes a redirection packet generator 302 and initiates transfer of the IP flow and sends the redirection packet 400. The UE includes a redirection packet controller 306 and perceives the reception of the redirection packet over WLAN as a request from the PGW 308 to transfer IP flow #1 to the WLAN interface. The UE 304 includes a redirection packet controller 306 which determines whether to accept or reject this request (a) based on its provisioned traffic steering rules (e.g. rules received from ANDSF), (b) based on the radio conditions over WLAN, and (c) based on implementation-specific policy and user preferences.

For example, the UE may reject a request to transfer a YouTube IP flow to 3GPP access, if it has an ANDSF traffic policy that requires YouTube over WLAN. The UE may reject a request to transfer an IP flow to WLAN access, if it has lost the WLAN signal or if the WLAN signal is very weak. The UE may reject a request to transfer an IP flow to 3GPP access, if the UE is running out of battery and local policy prohibits the UE from using simultaneously two radio interfaces.

In another embodiment, when the UE rejects a request to transfer an IP flow to WLAN because of conditions, such as temporary constraints (e.g. because the WLAN signal is currently poor), it marks this IP flow in memory as "transfer-required" either for a predetermined time period. If, during this predetermined time period, the condition that previously caused rejection of redirection no longer exists (e.g. the WLAN signal becomes acceptable), then the UE initiates the transfer of this IP flow as previously requested by the PGW. Alternatively, the UE can mark the IP flow as transfer-required until the condition causing the marking no longer exists.

Stated another way, the method and apparatus (UE or PGW) can receive the redirection packet and determine if the redirection complies with provisioned or local policy (e.g. if the redirection request complies with the provisioned ANDSF routing rules in the UE or the if redirection requests complies with the provisioned PCC rules in the PGW). Alternatively or in addition, receiving the redirection packet can include determining that a signal level received at the second RAT interface is above a desired threshold (e.g., at the UE). Alternatively or in addition, receiving the redirection packet can include determining that a local policy of the UE allows the UE to simultaneously use the first RAT interface and the second RAT interface (e.g., at the UE or PGW).

Conflicts Between Network-Initiated and UE-Initiated IP Flow Mobility

Since both the PGW 306 and the UE 304 can initiate IP flow mobility operations (by transmitting a redirection packet 400), there might be situations where the PGW 306 wants to transfer a certain IP flow to WLAN access whereas the UE 304 wants to transfer the same IP flow to 3GPP access. To address such situations, the following principles are applied.

When the PGW 306 requests to transfer an IP flow to a different RAT interface and this request is rejected by the UE 304, the PGW 306 marks the IP flow in memory as "non-transferable" and refrains from requesting mobility for this IP flow again. As discussed above, this IP flow is marked in the UE as "transferred-required" and the UE may initiate the transfer of this IP flow later if the rejection conditions are eliminated within a predetermined time period. As such, the PGW 306 communicates packet information of a first IP packet flow via the first RAT interface to the UE and transmits a redirection packet for the first IP packet flow via the second RAT interface to a UE during the communicating and marks the first IP packet flow as non-transferable to a second RAT in response to a rejection. The PGW 306 refrains from sending a further redirection packet for the first IP packet flow.

When the UE 304 requests to transfer an IP flow to a different RAT interface, the PGW 306 always accepts this request, unless error or extreme conditions occur in the network (for example, connectivity to the different RAT is temporarily unavailable). If the PGW 306 does not accept a UE request, the IP flow may be terminated due to bad radio conditions or other restrictions in the UE (e.g. restrictions derived from traffic policing in the UE).

Among other advantages, a redirection packet can be sent to cause redirection to occur between a first RAT interface and a second RAT interface as opposed to, for example, requiring complicated protocols to be employed or the exchange of routing rules. Utilizing the redirection packet approach has minor impact to the UE and the PGW and does not need to impact other network elements and can be easily implemented.

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine or dedicated logic capable of producing the same effect are also contemplated.

What is claimed is:

1. A method for providing internet protocol (IP) packet flow mobility from a first radio access technology (RAT) interface to a second radio access technology (RAT) interface in a first device, the method comprising:
   communicating packet information of a first IP packet flow between the first device and a second device via the first RAT interface;
   generating additional data for a redirection packet for the first IP packet flow based in part on an enforcement of a routing policy;
   transmitting the redirection packet with the additional data for the first IP packet flow to the second device via the second RAT interface during the communicating of the packet information of the first IP packet flow;
   receiving redirected packet information of the first IP packet flow from the second device via the second RAT interface in response to the transmitting of the redirection packet with the additional data; and
   transmitting redirected packet information of the first IP packet flow to the second device via the second RAT interface in response to the receiving of the redirected packet information.

2. The method of claim 1 further comprising:
   receiving the redirection packet with the additional data for the first IP packet flow from the second device via a second access interface corresponding to the second RAT interface; and
   transmitting the redirected packet information of the first IP packet flow to the second device via the second access interface based on the redirection packet with the additional data.

3. The method of claim 1 wherein the redirection packet further comprises:
   an IP header and upper protocol headers corresponding to the packet information of the first IP packet flow communicated via the first RAT interface, and data indicating the redirection packet should be discarded after receipt.

4. The method of claim 1 wherein the first device is a user equipment and the communicating, transmitting the redirection packet, receiving, and transmitting the redirected packet information are performed by the user equipment.

5. The method of claim 1 further comprising:
   communicating packet information of a second IP packet flow between the first device and the second device via the first RAT interface, prior to the transmitting of the redirected packet information of the first IP packet flow to the second device via the second RAT interface; and
   transmitting the packet information of the second IP packet flow to the second device via the first RAT interface, after the transmitting of the redirected packet information of the first IP packet flow to the second device via the second RAT interface.

6. The method of claim 1 wherein:
the first RAT interface is a cellular interface;
the packet information of the first IP packet flow includes first header information;
the redirection packet includes the first header information; and
the second RAT interface is a wireless local area network (WLAN) interface.

7. The method of claim 6 wherein the first header information comprises IP header information, and one of TCP header information or UDP header information; and the redirection packet also comprises data indicating the redirection packet should be discarded at an IP layer.

8. A method for providing internet protocol (IP) packet flow mobility from a first radio access technology (RAT) interface to a second radio access technology (RAT) interface in a user equipment (UE), the method comprising:
communicating packet information of a first IP packet flow between the UE and a second device via the first RAT interface;
receiving a redirection packet for the first IP packet flow at the UE from the second device via the second RAT interface during the communicating of the packet information of the first IP packet flow, wherein the redirection packet includes additional data;
determining that a traffic steering rule of the second RAT interface is satisfied based on the additional data in the redirection packet; and
in response to the determining, transmitting redirected packet information of the first IP packet flow to the second device via the second RAT interface.

9. The method of claim 8 wherein receiving the redirection packet comprises determining that an Access Network Discovery and Selection Function rule is satisfied.

10. The method of claim 8 wherein receiving the redirection packet comprises determining that a signal level received at the second RAT interface is above a desired threshold.

11. The method of claim 8 further comprising:
determining that a local policy of the UE allows the UE to simultaneously use the first RAT interface and the second RAT interface.

12. The method of claim 11 wherein the UE is operative to allow simultaneous use of the first RAT interface and the second RAT interface based on a battery level of the UE.

13. The method of claim 11 further comprising:
marking the first IP packet flow as transfer-required when a condition of the UE meets a threshold; and
wherein transmitting the redirected packet information to the second device via the second RAT interface comprises transmitting the redirected packet information when the condition no longer meets the threshold.

14. The method of claim 8 further comprising:
continuing to communicate the packet information of the first IP packet flow between the UE and the second device via the first RAT interface in response to a signal level of the second RAT interface being below a desired threshold.

15. The method of claim 8, wherein transmitting the redirected packet information of the first IP packet flow to the second device via the second RAT interface is further in response to determining that a radio condition of the second RAT interface is satisfied based on the additional data in the redirection packet.

16. The method of claim 8, wherein transmitting the redirected packet information of the first IP packet flow to the second device via the second RAT interface is further in response to determining that a preference is satisfied based on the additional data in the redirection packet.

17. A method for providing internet protocol (IP) packet flow mobility from a first radio access technology (RAT) interface to a second radio access technology (RAT) interface in a first device, the method comprising:
communicating packet information of a first IP packet flow between the first device and a second device via a first access interface corresponding to the first RAT interface;
generating additional data for a redirection packet for the first IP packet flow based in part on an enforcement of a routing policy;
transmitting the redirection packet with the additional data for the first IP packet flow to the second device via a second access interface corresponding to the second RAT interface during the communicating of the packet information of the first IP packet flow;
receiving redirected packet information of the first IP packet flow from the second device via the second access interface corresponding to the second RAT interface in response to the transmitting of the redirection packet with the additional data; and
transmitting redirected packet information of the first IP packet flow to the second device via the second access interface corresponding to the second RAT interface in response to the receiving of the redirected packet information.

18. An apparatus for providing internet protocol (IP) packet flow mobility from a first radio access technology (RAT) interface to a second radio access technology (RAT) interface, the apparatus comprising:
a first RAT interface;
a second RAT interface;
a processor, operatively coupled to the first RAT interface and the second RAT interface, the processor operative to:
communicate packet information of a first IP packet flow with a second device via the first RAT interface;
generate additional data for a redirection packet for the first IP packet flow based in part on an enforcement of a routing policy;
transmit the redirection packet with the additional data for the first IP packet flow to the second device via the second RAT interface during the communicating of the packet information of the first IP packet flow;
receive redirected packet information of the first IP packet flow from the second device via the second RAT interface in response to the transmitting of the redirection packet with the additional data; and
transmit redirected packet information of the first IP packet flow to the second device via the second RAT interface in response to the receiving of the redirected packet information of the first IP packet flow from the second RAT interface.

19. The apparatus of claim 18 wherein the redirection packet further comprises: an IP header with information matching IP header information of the packet information of the first IP packet flow communicated via the first RAT interface; and data indicating the received redirection packet should be discarded.

20. The apparatus of claim 18 wherein the apparatus is a user equipment.

21. A user equipment (UE) configured to provide internet protocol (IP) packet flow mobility from a first radio access technology (RAT) interface to a second radio access technology (RAT) interface, the apparatus comprising:
- a first RAT interface;
- a second RAT interface;
- a processor, operatively coupled to the first RAT interface and the second RAT interface, the processor operative to:
- communicate packet information of a first IP packet flow with a second device via the first RAT interface;
- receive a redirection packet for the first IP packet flow from the second device via the second RAT interface during the communicating of the packet information of the first IP packet flow, wherein the redirection packet includes additional data;
- determine that a traffic steering rule of the second RAT interface is satisfied based on the additional data in the redirection packet; and
- in response to the determining, transmit redirected packet information of the first IP packet flow to the second device via the second RAT.

22. The UE of claim 21 further comprising:
- a battery, coupled to the processor, wherein the processor is operative to determine that a battery level of the apparatus satisfies a threshold prior to the transmitting of the redirected packet information.

23. The UE of claim 21 wherein the processor is operative to:
- continue to communicate the packet information of the first IP packet flow with the second device via the first RAT interface;
- determine that a signal level received at the second RAT interface is above a desired threshold; and
- in response to the determining, transmit the redirected packet information of the first IP packet flow to the second device via the second RAT interface.

24. The UE of claim 23 wherein the processor is operative to continue to communicate the packet information of the first IP packet flow with the second device via the first RAT interface in response to a signal level of the second RAT interface being below a desired threshold.

25. The UE of claim 21 wherein the processor is operative to mark the first IP packet flow as requiring a transfer to a different RAT and to continue to communicate on the first RAT interface for a predetermined time period; and wherein the transmitting of the redirected packet information occurs after the predetermined time period has expired.

26. The UE of claim 21, wherein the processor is further operative to transmit the redirected packet information of the first IP packet flow to the second device via the second RAT interface in response to determining that a radio condition of the second RAT interface is satisfied based on the additional data in the redirection packet.

27. The UE of claim 21, wherein the processor is further operative to transmit the redirected packet information of the first IP packet flow to the second device via the second RAT interface in response to determining that a preference is satisfied based on the additional data in the redirection packet.

28. The UE of claim 21, wherein the processor is further operative to determine that a local policy of the UE allows the UE to simultaneously use the first RAT interface and the second RAT interface.

29. A method for providing internet protocol (IP) packet flow mobility from a first radio access technology (RAT) interface to a second radio access technology (RAT) interface in a first device, the method comprising:
- communicating packet information of a first IP packet flow between the first device and a second device via the first RAT interface;
- transmitting a redirection packet for the first IP packet flow to the second device via the second RAT interface during the communicating of the packet information of the first IP packet flow;
- receiving a redirection rejection from the second device in response to the transmitting of the redirection packet;
- marking the first IP packet flow as non-transferrable to the second RAT interface in response to the redirection rejection from the second device; and
- refraining from sending a further redirection packet for the first IP packet flow to the second device.

30. An apparatus for providing internet protocol (IP) packet flow mobility from a first radio access technology (RAT) interface to a second radio access technology (RAT) interface, the apparatus comprising:
- a first access interface;
- a second access interface;
- a processor, operatively coupled to the first access interface and the second access interface, the processor operative to:
- communicate packet information of a first IP packet flow with a second device via the first access interface that corresponds to the first RAT interface;
- generate additional data for a redirection packet for the first IP packet flow based in part on an enforcement of a routing policy;
- transmit the redirection packet with the additional data for the first IP packet flow to the second device via the second access interface that corresponds to the second RAT interface during the communicating of the packet information of the first IP packet flow;
- receive redirected packet information of the first IP packet flow from the second device via the second access interface that corresponds to the second RAT interface in response to the transmitting of the redirection packet with the additional data; and
- transmit redirected packet information of the first IP packet flow to the second device via the second access interface that corresponds to the second RAT interface in response to the receiving of redirected packet information of the first IP packet flow from the second access interface that corresponds to the second RAT interface.

31. The apparatus of claim 30 wherein the processor is operative to:
- further communicate packet information of a second IP packet flow with the second device via the first access interface that corresponds to the first RAT interface;
- transmit a second redirection packet for the second IP packet flow to the second device via the second access interface that corresponds to the second RAT interface during the further communicating;
- receive a rejection of the second redirection packet;
- mark the second IP packet flow as non-transferrable to the second access interface that corresponds to the second RAT interface in response to rejection, and
- refrain from sending a further redirection packet for the second IP packet flow.

* * * * *